June 7, 1955  H. WURZEL  2,710,202

TUBE TO WALL CONNECTION

Filed July 26, 1951  2 Sheets-Sheet 1

INVENTOR
HUGO WURZEL,
BY
ATTORNEY

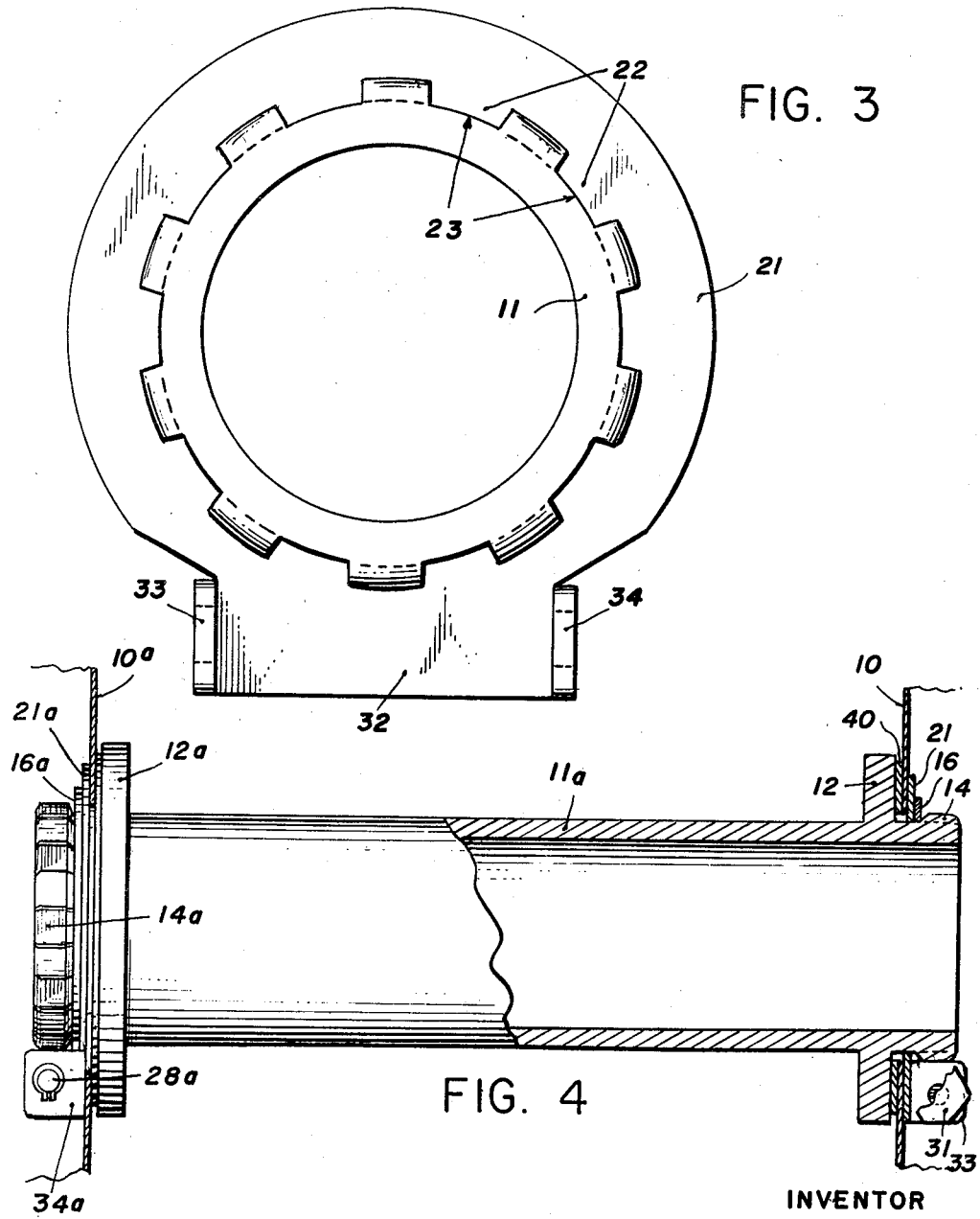

United States Patent Office 2,710,202
Patented June 7, 1955

2,710,202

TUBE TO WALL CONNECTION

Hugo Wurzel, Bronx, N. Y., assignor to Waldes Kohinoor, Inc., Long Island City, N. Y., a corporation of New York Application July 26, 1951, Serial No. 238,652

7 Claims. (Cl. 285—30)

This invention relates to improvements in tube to wall connections, and more particularly to an improved tube to wall connection for flexible-walled containers.

One application of tube fitting according to the invention is in connection with airplane fuel tanks which are conventionally made of a pliable plastic material, wherein a metallic tube may provide an outlet for the tank or a connection between the individual cells, i. e. "pliocels," containing the fuel. The requirements which such a tube fitting must satisfy are strict, in that the joint or connection between the tube and cell walls and/or outer tank wall must be leak-proof and of such structure as not to impede the flow of fuel through the tube.

The tube fittings heretofore used in such an application were not altogether satisfactory in meeting both of the aforesaid requirements, and it is accordingly a principal object of the present invention to provide an improved tube fitting for airplane fuel tanks and other flexible-walled vessels or containers which positively prevents leakage through the joint between the tube and flexible or pliable wall and which, moreover, permits a completely free and unobstructed flow of the fuel through the tube and hence through the opening or openings in the cell or container walls.

Another important object of the invention is the provision of a tube fitting of the stated character incorporating means mounted and arranged externally of the tube exclusively for securing the tube to cell or flexible wall extending along an opening therein through which the tube extends in fully leak-proof manner.

More particularly, the invention aims to provide a fitting for securing a tube within an opening provided in the wall of a flexible- or pliable-walled container which incorporates a split retaining ring so mounted and arranged on an end of the tube extending through the opening that when contracted it exerts axial pressure thereby to clamp and seal the cell wall along said opening.

A further object of the invention is the provision of a tube-to-cell wall securing means which may be assembled with ease and facility on an end of the tube which extends through an opening provided in the wall and which, when so assembled, is capable of being readily operated to permanently clamp the cell wall about the opening, while at the same time to provide a positive leak-proof joint between tube and wall.

Another specific object of the invention is the provision of a tube fitting for airplane fuel tanks made, for example, from pliable plastic material incorporating tube-to-cell wall securing means whose components may be handled and assembled as a unit and which are so constructed and arranged that when properly assembled on the tube it may be operated simply by the turning of a bolt forming one of the components to effectively secure the tube to the cell wall extending about an opening therein in full leak-proof manner.

The above and other objects and advantages will be clear from the following detailed description, taken with the accompanying drawings which illustrate a preferred form of tube fitting according to the invention, wherein—

Figure 2:
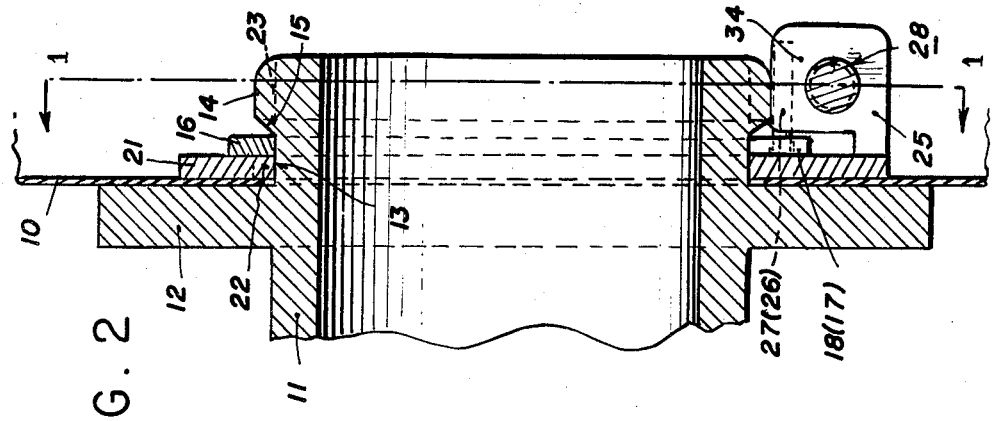
Fig. 2 is a section taken along line 2—2 of Fig. 1.
Figure 1:
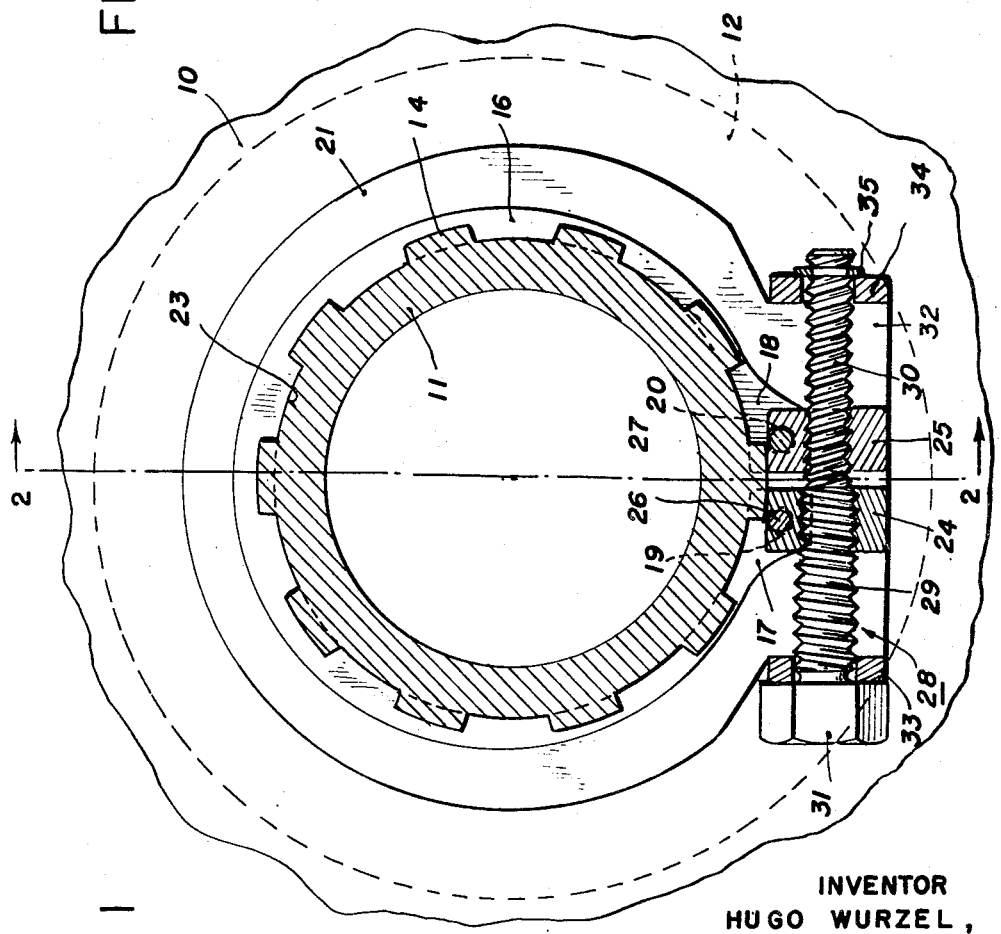
Fig. 1 is a front elevation, partly in section, of the improved tube fitting.

Fig. 3 is a detail view illustrating the tube fitting shown in Fig. 1 but with retaining ring and its contracting means removed; and Fig. 4 illustrates a tube fitting of the invention employed in connection with an interconnector tube extending between the adjacent fuel cells of an airplane fuel tank, the tube-to-cell wall securing means for the left-hand end of the tube being shown in side elevation and, for the right-hand end, in section as in Fig. 2.

Referring to the drawings, reference numeral 10 designates the flexible wall of a container provided with an opening to the interior thereof, through which extends the end of a tube 11 which is required to be secured to the flexible wall about said opening in fully leak-proof manner. It will be understood that the flexible wall 10 may be the cell wall of an airplane fuel tank which is conventionally made of a pliable plastic material.

The tube 11 is provided with an external flange 12 disposed inwardly from its end which is adapted to be passed through the cell wall opening, whereupon one face of the flange abuts or engages against one side of the cell wall extending about said opening. Disposed about the opening and to the other side of the cell wall 10 is an external groove 13, which may be advantageously provided by said flange in conjunction with a collar 14 on the projecting end of the tube. It is a feature of the invention that the inner end face 15 of the collar which defines the side wall of the groove removed from the cell wall is inclined inwardly or toward the cell wall.

A split, i. e. open-ended, spring retaining ring 16, preferably of tapered construction whereby it deforms circularly and being fashioned at its free ends with ears or lugs 17, 18 provided with apertures 19, 20 (Fig. 1), is adapted to seat in the groove 13. As is well known, such a retaining ring is capable of being spread and contracted radially within limits and thus it may be assembled in the groove 13 simply by spreading it over the collar 14 and thereupon shifting it axially to the plane of the groove, so that when released its inner edge engages against the inclined groove wall 15 with spring pressure.

Preferably, a washer 21 is also disposed in the groove 13, being interposed as shown between the retaining ring 16 and the portion of the cell wall extending about said opening, so as to have face engagement with the cell wall which is thus disposed intermediate the washer and the tube flange 12. The washer 21 functions to increase the clamping area effective on cell wall 10, as compared to the lesser clamping area provided solely by the radial face of the retaining ring, due to the relatively small radial with of the latter. With the above described construction, it will be observed that, consequent to the engagement of retaining ring inner edge on the inclined groove wall 15, the retaining ring tends to wedge itself into the groove and thereby presses the washer 21 in axial direction, the washer in turn tending to clamp the cell wall extending about its opening against the tube flange 12.

To allow for ready assembly of the washer 21 in the groove 13, despite the fact that as shown its inner edge has diameter less than the external diameter of the tube collar 14, the washer is provided with a plurality of spaced inner-edge teeth 22, and the tube collar 14 is formed with a series of correspondingly spaced and complementally shaped notches 23 dimensioned to accommodate the teeth 22. Hence, as best seen in Fig. 3, the washer teeth 22 and the collar notches 23 in effect provide complemental serrations which allow assembly of the washer 21 simply by registering the teeth with the notches and thereupon shifting the washer axially over the collar to its position illustrated in Fig. 2. This arrangement permits the formation of the washer 21 with inner diameter only slightly exceeding that of the bottom of the groove 13, which is desirable for the purpose of substantially eliminating any play between the washer 21 and tube when the former is assembled on the tube.

The invention also contemplates the provision of common means for supporting the retaining ring 16 on and for centering it with respect to the washer 21, and which is preferably also effective to forcibly contract the retaining ring so as to effect a permanent clamping of the cell wall between tube flange 12 and washer 21 under a pressure which is sufficiently high as to insure a leak-proof joint between cell wall and tube. Illustratively, such means includes a pair of nuts 24, 25 carrying pins 26, 27 which, as seen in Figs. 1 and 2, project through the apertures 19, 20 in the lugs 17, 18 formed at the free ends of the retaining ring 16. The nuts are tapped with threads of opposite lead and receive a bolt 28 having length portions 29 and 30 which are threaded to correspond to the opposite threading of the nuts 24, 25. Thus, it will be seen that by turning the bolt 28 in one direction, as by a wrench or other suitable tool coupled to its head 31, the nuts will simultaneously move away from one another and thereby effect spreading of the retaining ring 16. Conversely, as the bolt 28 is turned in the opposite direction, the nuts 24, 25 move towards one another to effect a forcible contraction of the retaining ring.

To provide bearing for the bolt 28, the washer 21 may be fashioned with a bracket-like extension 32 (Fig. 3), whose ends are turned at right angles to the plane of the washer body and apertured, to provide spaced bolt-supporting ears 33, 34 in which the bolt 28 is journaled for free rotation. It will be observed that the under face of the bolt head 31 engages against one of the ears 33 and thus the bolt is held against axial movement in one direction. Axial separation of the bolt from its ear supports by movement in the other direction is precluded by suitable means such as retaining ring 35 seating in a groove provided at the other end of the bolt and positioned to abut against the other ear 34.

It will be observed that since the bolt 28 is carried by the washer 21 and the nuts 24 and 25 are both carried by the bolt and affixed to the retaining ring 16 through pins 26, 27, said retaining ring is not only supported from the washer, but also it is effectively centered with respect thereto. Hence parts form the components of a securing unit which may be handled and readily assembled as such. Thus, to assemble the securing unit in the groove 13, it is only necessary to turn the bolt 28 in the proper direction an amount as to spread the retaining ring so that it clears the tube collar 14, thereupon to line up the washer teeth 22 with the collar notches 23, thereupon to shift the securing unit axially over the tube collar 14 until the retaining ring 16 arrives at the plane of the inclined groove wall 15, and finally to turn the bolt 28 in the opposite direction thereby to effect forcible contraction of the ring and tight clamping engagement of the washer against the cell wall disposed intermediate the washer and tube flange 12. When forcibly contracted as aforesaid, there results a leak-proof joint between cell wall 10 and flange 12, and it will moreover be seen that since the cell-wall clamping and sealing means are disposed externally of the tube, free flow of the fuel or other liquid through the tube is assured.

A tube fitting as aforesaid may be employed to secure an outlet or discharge tube within a discharge opening provided in a flexible-walled container such as a fuel tank made from pliable plastic material, and it may also be employed to secure a connector tube extending between the adjacent cells of a cell-type fuel tank in the manner indicated in Fig. 4. In the latter application, the tube 11a is provided with external flanges 12 and 12a spaced from one another a distance corresponding to the distance between the outer walls 10, 10a of the adjacent fuel cells. Said walls are provided with openings through which the ends of the tube extend and each wall is clamped against a face of the flange by clamping and securing means as described above. Since the wall-clamping and securing means applied to both ends of the tube are identical and conform to that previously described, further description thereof is believed to be unnecessary, except to explain that the components of the left-end securing means are designated similarly to like components of the right-end securing means, but of the a series.

It will be noted that Fig. 4 illustrates a sealing gasket designated 40 disposed intermediate the cell wall 10 and flange 12. Such a gasket may also be applied to the tube end securing means illustrated in Figs. 1–3 for the added sealing function it provides.

Without further analysis, it will be appreciated that the improved tube fitting of the invention achieves in simple and effective manner the objectives therefor stated in the foregoing. In addition to providing a fully leak-proof joint between the flexible wall and tube about the wall opening for the tube, a free and unobstructed flow of fuel or other liquid through the tube is assured, since all of the components of the tube-to-wall securing means are disposed externally of the tube. Moreover, the aforesaid components are joined together as an assembly unit, which allows for simple handling and assembly on the tube. Equally notable is the ease and facility with which the aforesaid securing means may be operated to perform the desired wall clamping and joint sealing function following its initial assembly on the tube, since such operation entails only the turning of a bolt in proper direction.

As many changes could be made in carrying out the above construction without departing from the scope of the invention, it is intended that all matter contained in the above description or shown in the accompanying drawing shall be interrupted as illustrative and not in a limiting sense.

I claim:

1. In a fitting for securing a tube within an opening provided in a flexible-walled container and the like, the combination of a tube having an external flange intermediate its ends which is adapted to engage one side of the flexible wall upon an end of the tube being passed through the opening, said tube-end having an external groove extending alongside said opening, an axially movable clamp washer disposed in said groove and adapted to clampingly engage the other side of the flexible wall, the groove side wall removed from the flexible wall being inclined radially inwardly toward said flexible wall so as to provide a circular wedge surface, an open-ended spring metal retaining ring seated in said groove in face engagement with said washer and with its inner edge engaging with spring pressure on said inclined groove wall, whereby said retaining ring tends to move axially toward and into engagement with said washer, and means for supporting said retaining ring from and for centering it on said washer and being also effective to forcibly contract said retaining ring against said inclined groove wall, thereby to cause said retaining ring to press against said washer and said washer to clamp the flexible wall to said tube flange.

2. In a fitting for securing a tube within an opening provided in a flexible-walled container and the like, the combination of a tube having an external flange intermediate its ends which is adapted to engage one side of the flexible wall upon an end of the tube being passed through the opening and an external collar formed on said tube-end, said collar being spaced from said flange and said space providing a groove disposed alongside other side of the flexible wall, an axially movable clamp washer disposed in said groove and adapted to clampingly engage the other side of the flexible wall, the end face of the tube collar forming the side wall of the groove removed from the flexible wall being inclined radially inwardly toward said flexible wall so as to provide a circular wedge surface, an open-ended spring metal retaining ring seated in said groove with its inner edge engaging with spring pressure on said inclined groove wall, whereby said retaining ring tends to move axially toward and into engagement with said washer, and means for supporting said retaining ring from and for centering it on said washer and being also effective to forcibly contract said retaining ring against said inclined groove wall, thereby to cause said retaining ring to press against said washer and said washer to clamp the flexible wall to said tube flange.

3. A tube fitting as set forth in claim 2, wherein the washer and collar are formed with complemental serrations permitting axial assembly of the washer in the groove.

4. A tube fitting as set forth in claim 2, wherein the washer is provided with inner-edge teeth, the inner edges of which lie on a circle of diameter less than that of the external diameter of the tube collar, and said collar is provided with notches disposed complementally to said teeth whereby the washer may be assembled in the groove by axial movement over the collar.

5. A tube fitting as set forth in claim 1, wherein said last means includes oppositely tapped nuts connected to the free ends of the retaining ring, and a bolt threadedly related to said nuts, said bolt having oppositely threaded portions, the opposite threads of which correspond to the opposite tapping of the nuts.

6. A tube fitting as set forth in claim 5, wherein the nuts are connected to the free ends of the retaining ring by pins affixed to the nuts and which fit into apertures provided in the free ends of the ring.

7. A tube fitting as set forth in claim 1, wherein the last means includes oppositely tapped nuts connected to the free ends of the retaining ring, a bolt having oppositely threaded portions threadedly connected to said nuts, and spaced ears on said washer extending at right angles to the plane thereof, said bolt being journaled for rotation in said ears.

References Cited in the file of this patent

UNITED STATES PATENTS

| | | |
|---|---|---|
| 485,484 | Arnold | Nov. 1, 1892 |
| 491,469 | Carver | Feb. 7, 1893 |
| 1,272,714 | Reinhalter | July 16, 1918 |
| 1,882,616 | Hutchinson | Oct. 11, 1932 |
| 2,180,960 | Kennedy | Nov. 21, 1939 |
| 2,487,803 | Heimann | Nov. 15, 1949 |